United States Patent [19]

Coran et al.

[11] 3,860,605
[45] Jan. 14, 1975

[54] N-(THIO)-HYDANTOINS

[75] Inventors: Aubert Yaucher Coran; Joseph Edward Kerwood, both of Akron, Ohio

[73] Assignee: Monsanto Company, St. Louis, Mo.

[22] Filed: Nov. 13, 1972

[21] Appl. No.: 306,172

Related U.S. Application Data

[60] Division of Ser. No. 29,717, March 27, 1970, Pat. No. 3,752,824, which is a division of Ser. No. 714,445, March 20, 1968, Pat. No. 3,546,185, which is a continuation-in-part of Ser. No. 579,493, Sept. 15, 1966, abandoned, and a continuation-in-part of Ser. No. 549,730, May 12, 1966, abandoned, and a continuation-in-part of Ser. No. 459,466, May 27, 1965, abandoned.

[52] U.S. Cl. ............................................. 260/309.5
[51] Int. Cl. ............................................. C07d 49/32
[58] Field of Search ................................. 260/309.5

[56] References Cited
UNITED STATES PATENTS
2,886,487  5/1959  Kupferberg et al. .............. 260/309.5
FOREIGN PATENTS OR APPLICATIONS
1,500,844  10/1967  France ............................ 260/309.5
967,167  8/1964  Great Britain .................... 260/309.5

OTHER PUBLICATIONS
Buchel et al., Chem. Ber. Vol. 100, Pages 1248–1251, (1967), QD1.D4.
Goerdeler et al., Chem. Ber. Vol. 95, pages 389–402 (1962), QD1.D4.
Chemical Abstracts, Subject Index A–1, Vol. 60, page 1287S (1964), QD1.A51.
Mittra et al., J. Indian Chem. Soc., Vol. 40, pages 993–997 (1963), QD1.I6.
Bailey et al., J. Amer. Chem. Soc., Vol. 38, pages 2,523–2,527 (1916), QD1.A5.

*Primary Examiner*—Natalie Trousof

[57]  ABSTRACT

Sulfenamides characterized by carbonyl adjacent to the sulfenamide nitrogen of the formula

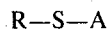

in which A is 3-hydantoinyl and substituted 3-hydantoinyl and R is alkyl, aryl or cycloalkyl are inhibitors of premature vulcanization of vulcanizable elastomers.

10 Claims, No Drawings

N-(THIO)-HYDANTOINS

CROSS REFERENCES TO RELATED APPLICATIONS

This application is a division of copending application Ser. No. 29,717 filed Mar. 27, 1970 now U.S. Pat. No. 3,752,824 granted Aug. 14, 1973, a division of application Ser. No. 714,445 filed Mar. 20, 1968, now U.S. Pat. No. 3,546,185 granted Dec. 8, 1970, which is a continuation-in-part of the application Ser. No. 579,493 filed Sept. 15, 1966, now abandoned, a continuation-in-part of the application Ser. No. 549,730 filed May 12, 1966, now abandoned, and a continuation-in-part of the application Ser. No. 459,466 filed May 27, 1965, now abandoned.

BACKGROUND OF THE INVENTION

This invention relates to an improved vulcanizing process for rubber and to the rubber stocks obtained by using this improved process. The invention relates to improved accelerator-inhibitor combinations for rubber. The invention also relates to new compounds useful as inhibitors of premature vulcanization in rubber. More particularly, the invention relates to a method for preventing the premature vulcanization of rubber stocks and to the rubber stocks obtained by using this method.

In the manufacture of vulcanized rubber products, crude rubber is combined with various other ingredients such as fillers, accelerators, and antidegradants to alter and improve processing of the rubber and to improve the properties of the final product. The crude rubber is put through several steps in the plant before it is ready for the final step of vulcanization. Generally the rubber is mixed with carbon black and other ingredients except the vulcanizing agent and accelerator. Then the vulcanizing and accelerating agents are added to this masterbatch in a Banbury mixer or a mill. Scorching, viz., premature vulcanization, can occur at this stage of the processing, during the storage period before vulcanizing, and during the actual vulcanization. After the vulcanizing and accelerating agents are added, the mixture of crude rubber is ready for calendering or extruding and vulcanization. If premature vulcanization occurs during the storage of the crude mixture of during processing prior to vulcanization, the processing operations cannot be carried out because the scorched rubber is rough and lumpy, consequently useless. Premature vulcanization is a major problem in the rubber industry and must be prevented in order to allow the rubber mix to be preformed and shaped before it is cured or vulcanized.

There are several reasons offered for premature vulcanization. The discovery of the thiazolesulfenamide accelerators constituted a major breakthrough in the vulcanization art because thiazolesulfenamides delayed onset of the vulcanizing process, but once it started the built-in amine activation of the thiazole resulted in strong, rapid curing. Mercaptobenzothiazole is a valuable organic vulcanization accelerator but by present standards would be considered scorchy. It has been largely replaced by the delayed-action accelerators, but futher improvement has eluded the art. The development of high pH furnace blacks which lack the inherent inhibiting effect of the acidic channel blacks and the popularity of certain phenylenediamine antidegradants which promote scorching have placed increasingly stringent demands on the accelerator system.

Retarders have long been available to rubber compounders. These include N-nitrosodiphenylamine, salicylic acid, and a terpene-resin acid blend. See Editors of *Rubber World*, "Compounding Ingredients for Rubber," 91–94 (3rd Ed., 1961). Acids as retarders are generally ineffective with thiazolesulfenamide accelerators or adversely affect this vulcanizing process. Nitrosoamines as retarders are only of limited effectiveness with thiazolesulfenamides derived from primary amines. Certain sulfenamides which are not accelerators per se have been shown to retard mercaptobenzothiazole and other scorchy accelerators, but the effect on another sulfenamide incorporated as the primary accelerator has been marginal. Similarly, mixtures of accelerating sulfenamides have been proposed as a means of improving processing safety, but neither of these innovations has significantly improved a good delayed-action accelerator.

Some of the inhibitors of the invention have vulcanizing and accelerating properties in their own right. For example, Belgian Pat. No. 619,219 (1962) to U.S. Rubber discloses N-[(trichloromethyl) thio] maleimide as a vulcanizing agent. The sulfur-vulcanizing agents, accelerators, and antidegradants used in the combinations of this invention do not include the inhibitors of the invention. A combination of an accelerator and an inhibitor of this invention is an improved rubber additive which allows longer and safer processing time for rubber.

SUMMARY OF THE INVENTION

We have discovered a class of sulfenamides which are extremely valuable inhibitors of premature vulcanization. These are characterized by the presence of a carbonyl group adjacent to the sulfenamide nitrogen. The characteristic nucleus is

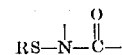

where the dangling valence on the nitrogen may be linked to a second carbonyl, alkyl, aryl, cycloalkyl, hydrogen, alkylene carbon, or arylene carbon and R is alkyl, aryl, or cycloalkyl. Aryl is used in the usual sense to mean any univalent organic radical where free valence belongs to an aromatic carbocyclic nucleus and not to a side chain. Aryl radicals may be substituted in the carbocyclic nucleus, for example, by alkyl, alkoxy, nitro, chloro, bromo, fluoro, iodo, and hydroxy. It is preferred that the carbocyclic nucleus contain not more than one electronegative substituent. Alkyl is used in the usual sense to mean univalent aliphatic radicals of the series $C_nH_{2n+1}$. Primary, secondary, and tertiary alkyls are included, for example, straight or branched chains. However, primary and secondary alkyl of 1 to 20 carbon atoms are the preferred alkyl compounds of this invention. The term cycloalkyl includes cycloalkyl radicals of 5 to 12 carbon atoms in the ring. Carbon atoms of the heterocyclic nuclei which contain hydrogen can be substituted by alkyl, alkoxy, nitro, chloro, bromo, fluoro, iodo, and hydroxy, for example, 1,3-bis (phenylthio)-5-chloro-2-benzimidazolinone.

An object of this invention is to promote the progress of science and useful arts. An object of this invention is to provide a method to effectively prevent the premature vulcanization of rubber. A further object of this invention is to provide new chemical compounds useful as premature vulcanization inhibitors especially with delayed-action thiazolesulfenamides. A further object of this invention is to provide a method for a faster rate of cure for vulcanizable rubber without premature vulcanization. A further object of this invention is to provide a method to increase the available processing time prior to the actual vulcanization of rubber. A further object of this invention is to provide a method to prevent the premature vulcanization of crude rubber in storage containing a vulcanizing and accelerating agent. A further object of this invention is to provide a method to prevent the premature vulcanization of rubber during the actual vulcanization step. A further object of this invention is to prevent the premature vulcanization of rubber at any time. A further object of this invention is to provide a safer method for processing and vulcanizing rubber. A further object of this invention is to provide a stabilizer for rubber. A further object of this invention is to provide new and improved vulcanized rubber products. A further object of this invention is to provide a vulcanized rubber stock in which the rate of reversion is reduced. Other objects of the invention will become apparent as the description of our invention proceeds. These objects are accomplished by using a sulfenamide derived from an amide or imide in the processing of rubber.

DESCRIPTION OF THE PREFERRED EMBODIMENTS

Our invention is that compounds having the formula

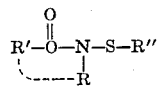

are excellent premature vulcanization inhibitors for a vulcanizable diene rubber where R and R' with the carbonyl and nitrogen atom constitute a radical, for example, N-phthalimidyl, N-succinimidyl, N-adipimidyl, N-glutarimidyl, N-3,3-dimethyl-glutarimidyl, N-hexahydrophthalimidyl, 7-oxabicyclo[2.2.1]heptane-2,3-dicarboximid-N-yl, 7-oxabicyclo [2.2.1] hept-5-ene-2,3-dicarboximid-N-yl, tetrapropenylsuccinimid-N-yl, methylsuccinimid-N-yl, octadecylsuccinimid-N-yl, n-decenylsuccinimid-N-yl, 1,4,5,6,7,7,-hexachlorobicyclo [2.2.1] hept-5-ene-2,3-dicarboximid-N-yl, 5,5-dimethyl-3-hydantoinyl, hydantoinyl, 5,5-diphenyl-3-hydantoinyl, 1-(R''-S-)-3-hydantoinyl, 1-(R''-S-)-5,5-dimethyl-3-hydantoinyl, N-maleimidyl, 4-cyclohexene-1,2-dicarboximid-N-yl, 2-benzimidazolinon-1-yl, 2-benzothiazolinon-N-yl, 3-arylthio-2-benzimidazolinon-1-yl, 3-alkylthio-2-benzimidazolinon-1-yl, 3-cycloalkylthio-2-benzimidazolinon-1-yl, 2-imidazolinon-1-yl, 3-cycloalkylthio-2-imidazolinon-1-yl, 3-arylthio-2-imidazolinon-1-yl, 3-alkylthio-2-imidazolinon-1-yl, 2-imidazolidinon-1-yl, 3-cycloalkylthio-2-imidazolidinon-1-yl, 3-arylthio-2-imidazolidinon-1-yl, 3-alkylthio-2-imidazolidinon-1-yl, bicyclo [2.2.1] hept-5-ene-2,3-dicarboximid-N-yl, alkylbicyclo [2.2.1] hept-5-ene-2,3-dicarboximid-N-yl, N-(arylthio)-1,2,4,5-benzenetetracarboxylic-1,2:4,5-diimid-N'-yl, N-(cycloalkylthio)-1,2,4,5-benzenetetracarboxylic-1,2:4,5-diimid-N'-yl, N-(alkylthio)-1,2,4,5-benzenetetracarboxylic-1,2:4,5-diimid-N'-yl, N-naphthalimidyl, or N-(3,4,5,6-tetrahalophthalimidyl), and R'' is alkyl, aryl, or cycloalkyl. More specific examples of R'' are CCl$_3$, methyl, ethyl, propyl, isopropyl, butyl, amyl, t-butyl, phenyl, benzyl, chlorophenyl, nitrophenyl, tolyl, naphthyl, cyclooctyl, cyclopentyl, and cyclododecyl.

The premature vulcanization inhibitors of this invention include compounds of the formula

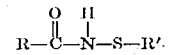

where

constitutes a radical, for example, N-(arylthio)-carbamoyl, N-(cycloalkylthio)carbamoyl, N-(alkylthio)carbamoyl, N-arylcarbamoyl, N-alkylcarbamoyl, and N-cycloalkylcarbamoyl, and R' is alkyl, aryl, or cycloalkyl. More specific examples of

are N-(phenylthio)carbamoyl, N-(chlorophenylthio)-carbamoyl, N-(benzylthio)carbamoyl, N-(tolylthio)-carbamoyl, N-(methylthio)-carbamoyl, N-(ethylthio)-carbamoyl, N-(propylthio)carbamoyl, N-(isopropylthio)carbamoyl, N-(t-butylthio)carbamoyl, N-phenylcarbamoyl, N-methylcarbamoyl, N-ethylcarbamoyl, N-propylcarbamoyl, N-isopropylcarbamoyl, N-t-butylcarbamoyl, N-trichloromethylcarbamoyl, N-benzylcarbamoyl, N-nitrophenylcarbamoyl, N-chlorophenylcarbamoyl, and N-tolylcarbamoyl, and more specific examples of R' are methyl, ethyl, propyl, isopropyl, t-butyl, trichloromethyl, phenyl, benzyl, chlorophenyl, tolyl, nitrophenyl, naphthyl, sec. butyl, n-butyl, n-amyl, n-hexyl, n-heptyl, 2-ethylhexyl, n-octyl, n-decyl, n-undecyl, n-dodecyl, n-tridecyl, o-tolyl, p-tolyl, m-tolyl, p-ethylphenyl, p-isopropylphenyl, cyclooctyl, cyclopentyl, and cyclododecyl.

Examples of the new compounds of the invention are N-(cyclohexylthio)adipimide, N-(cyclopentylthio)adipimide, N-(cyclododecylthio)adipimide, N-(cyclooctylthio)adipimide, N-(benzylthio)adipimide, N-(methylthio)adipimide, N-(ethylthio)-adipimide, N-(propylthio)adipimide, N-(isopropylthio)adipimide, N-(n-butylthio)adipimide, N-(t-butylthio)adipimide, N-(isobutylthio)-adipimide, N-(sec.-butylthio)adipimide, N-(n-pentylthio)adipimide, N-(n-heptylthio)adipimide, N-(n-hexylthio)adipimide, N-(n-octylthio)adipimide, N-(n-dodecylthio)adipimide, N-(phenylthio)adipimide, N-(tolylthio)adipimide, N-(cyclohexylthio)glutarimide, N-(cyclooctylthio)glutarimide, N-(cyclopentylthio)-glutarimide, N-(cyclododecylthio)glutarimide, N-(benzylthio)glutarimide, N-(methylthio)glutarimide, N-(ethylthio)glutarimide, N-(propylthio)-glutarimide, N-(isopropylthio)glutarimide, N-(n-butylthio)glutarimide, N-(t-butylthio)glutarimide, N-(isobutylthio)glutarimide, N-(sec.-butylthio)glutarimide, N-(n-pentylthio)glutarimide, N-(n-heptylthio)-glutarimide, N-(n-hexylthio)glutarimide, N-(n-octylthio)glutarimide, N-(n-dodecylthio)glutarimide, N-phenylthio)-glutarimide, N-(tolylthio)glutarimide, N-(cyclohexylthio)-3,3-dimethylglutarimide, N-(cyclooctylthio)-3,3-dimethylglutarimide, N-(cyclopentylthio)-3,3-dimethylglutarimide, N-(cyclododecylthio)-3,3-dimethylglutarimide, N-(benzylthio)-3,3-dimethylglutarimide, N-(methylthio)-3,3-dimethylglutarimide, N-(ethylthio)-3,3-dimethylglutarimide, N-(propylthio)-3,3-dimethylglutarimide, N-(isopropylthio)-3,3-dimethylglutarimide, N-(n-butylthio)-3,3-dimethylglutarimide, N-(t-butylthio)-3,3-dimethylglutarimide, N-(isobutylthio)-3,3-dimethylglutarimide, N-(sec.-butylthio)-3,3-dimethylglutarimide, N-(n-pentylthio)-3,3-dimethylglutarimide, N-(n-heptylthio)-3,3-dimethylglutarimide, N-(n-hexylthio)-3,3-dimethylglutarimide, N-(n-octylthio)-3,3-dimethylglutarimide, N-(n-dodecylthio)-3,3-dimethylglutarimide, N-(phenylthio)-3,3-dimethylglutarimide, N-(tolylthio)-3,3-dimethylglutarimide, N,N'-di(phenylthio)urea, N,N'-di(cyclohexylthio)urea, N,N'-di(cyclooctylthio)urea, N,N'-di(chlorophenylthio)urea, N,N'-di(benzylthio)urea, N,N'-di(tolylthio)urea, N,N'-di(t-butylthio)urea, N,N'-di(methylthio)urea, N,N'-di(ethylthio)urea, N,N'-di(propylthio)urea, N,N'-di(isopropylthio)urea, N,N'-di(n-dodecylthio)urea, cyclohexylthio-3-hydantoin, 1,3-bis(cyclohexylthio)hydantoin, cyclooctylthio-3-hydantoin, 1,3-bis(cyclooctylthio)hydantoin, cyclopentylthio-3-hydantoin, 1,3-bis(cyclopentylthio)hydantoin, cyclododecylthio-3-hydantoin, 1,3-bis(cyclododecylthio)hydantoin, phenylthio-3-hydantoin, 1,3-bis(phenylthio)hydantoin, chlorophenylthio-3-hydantoin, 1,3-bis(chlorophenylthio)hydantoin, benzylthio-3-hydantoin, 1,3-bis(benzylthio)hydantoin, tolylthio-3-hydantoin, 1,3-bis(tolylthio)hydantoin, methylthio-3-hydantoin, 1,3-bis-(methylthio)hydantoin, ethylthio-3-hydantoin, 1,3-bis(ethylthio)-hydantoin, propylthio-3-hydantoin, 1,3-bis(propylthio)hydantoin, isopropylthio-3-hydantoin, 1,3-bis(isopropylthio)hydantoin, dodecylthio-3-hydantoin, 1,3-bis(dodecylthio)hydantoin, 5,5-dimethyl-3-(cyclohexylthio)hydantoin, 5,5-dimethyl-3-(cyclooctylthio)hydantoin, 5,5-dimethyl-3-(phenylthio)hydantoin, 5,5-dimethyl-3-(chlorophenylthio)hydantoin, 5,5-dimethyl-3-(benzylthio)-hydantoin, 5,5-dimethyl-3-(tolylthio)hydantoin, 5,5-dimethyl-3-(nitrophenylthio)hydantoin, 5,5-dimethyl-3-(t-butylthio)-hydantoin, 5,5-dimethyl-3-(methylthio)hydantoin, 5,5-dimethyl-3-(ethylthio)hydantoin, 5,5-dimethyl-3-(propylthio)hydantoin, 5,5-dimethyl-3-(isopropylthio)hydantoin, 5,5-dimethyl-3-(n-dodecylthio)hydantoin.

Known compounds useful as premature vulcanization inhibitors in the practice of our invention include, for example, N,N'-di(nitrophenylthio)urea, N-(phenylthio)phthalimide, N-(p-chlorophenylthio)phthalimide, N-(o-tolylthio)phthalimide, N-(m-tolylthio)phthalimide, N-(o-nitrophenylthio)phthalimide, N-(p-chlorophenylthio)succinimide, N-(o-tolylthio)succinimide, N-(m-tolylthio)succinimide, N-(p-tolylthio)succinimide, N-(t-butylthio)succinimide, N-(phenylthio)-succinimide, N-(nitrophenylthio)succinimide, N-(n-dodecylthio)succinimide, N-(benzylthio)-succinimide, N-[(trichloromethyl)thio]phthalimide, 1,4,5,6,7,7-hexachloro-N-(trichloromethylthio)bicyclo[2.2.1]hept-5-ene-2,3-dicarboximide, 5,5-dimethyl-3-[(trichloromethyl)thio]hydantoin, 5,5-diphenyl-3-[(trichloromethyl)thio]-hydantoin, N-[(trichloromethyl)thio]maleimide, N-[(trichloromethyl)thio]-4-cyclohexene-1,2-dicarboximide, and N-[(trichloromethyl)thio]succinimide.

Further examples of the compounds useful as premature vulcanization inibitors in this invention are N-(naphthylthio)-phthalimide, N-(n-butylthio)succinimide, N-(methylthio)succinimide, N-(ethylthio)succinimide, N-(propylthio)succinimide, N-(isopropylthio)succinimide, N-(cyclohexylthio)succinimide, and N-(cyclooctylthio)succinimide; 1,3-bis(n-hexylthio)-1,3-dicyclohexyl-urea, N-phenyl-N'-(phenylthio)urea, N-phenyl-N'-(methylthio)urea, N-phenyl-N'-(ethylthio)urea, N-phenyl-N'-(propylthio)urea, N-phenyl-N'-(isopropylthio)urea, N-phenyl-N'-(t-butylthio)urea, N-phenyl-N'-(n-dodecylthio)urea, N-phenyl-N'-(cyclohexylthio)urea, N-phenyl-N'-(cyclooctylthio)urea, N-methyl-N'-(phenylthio)urea, N-ethyl-N'-(phenylthio)urea, N-propyl-N'-(phenylthio)urea, N-isopropyl-N'-(phenylthio)urea, N-t-butyl-N'-(phenylthio)urea, N-cyclooctyl-N'-(phenylthio)urea, N-cyclohexyl-N'-(phenylthio)urea, N-n-dodecyl-N'-(phenylthio)urea, and variations thereof; and N-(cyclododecylthio)succinimide.

Rubber stocks containing delayed-action accelerators can be used in the process of this invention. Cheaper, more scorchy accelerators can also be used with an excellent degree of improvement. The improved vulcanizing process of this invention can be used advantageously to process stocks containing furnace blacks as well as stocks containing other types of blacks and fillers used in rubber compounding. The invention is also applicable to gum stocks.

Our invention is also applicable to rubber mixes containing sulfur-vulcanizing agents, peroxide-vulcanizing agents, organic accelerators for vulcanization, and antidegradants, none being the inhibitor used. For the purposes of this invention, sulfur-vulcanizing agent means elemental sulfur or sulfur containing vulcanizing agent, for example, an amine disulfide or a polymeric polysulfide. The invention is applicable to vulcanization accelerators of various classes. For example, rubber mixes containing the aromatic thiazole accelerators which include benzothiazyl-2-monocyclohexylsulfenamide, 2-mercaptobenzothiazole, N-tert-butyl-2-benzothiazole sulfenamide, 2-benzothiazolyl diethyldithiocarbamate, and 2-(morpholinothio)benzothiazole can be used. Amine salts of mercaptobenzothiazole accelerators, for example, the t-butyl amine salt of mercaptobenzothiazole, like salts of morpholine, and 2,6-dimethyl morpholine, can be used in the invention. Thiazole accelerators other than aromatic can be used. Stocks containing accelerators, for example, the tetramethylthiuram disulfide, tetramethylthiuram monosulfide, aldehyde amine condensation products, thicarbamylsulfenamides, thioureas, xanthates, and guanidine derivatives, are substantially improved using the process for our invention. Examples of thiocarbamylsulfenamide accelerators are shown in U.S. Pat. Nos. 2,381,392, Smith assigned to Firestone, 2,388,236, Cooper assigned to Monsanto, 2,424,921, Smith assigned to Firestone, and British Pat. No. 880,912, Dadson assigned to Imperial Chemical Industries Limited. The invention is applicable to accelerator mixtures.

The invention is applicable to stocks containing amine antidegradants. Rubber mixes containing antidegradants, for example, N-1,3-dimethylbutyl-N'-phenyl-p-phenylenediamine, N,N'-bis(1,4-dimethylpentyl)-p-phenylenediamine, and other phenylenediamines, ketone, ether, and hydroxy antidegradants and mixtures thereof, are substantially improved using the process of our invention. Mixtures of antidegradants, for example, a mixture of N-1,3-dimethylbutyl-N'-phenyl-p-phenylenediamine and N,N'-bis-(1,4-dimethylpentyl)-p-phenylenediamine, furnish a much improved final product when used with the inhibitors of this invention.

The inhibitors of our invention can be used in natural and synthetic rubbers and mixtures thereof. Synthetic rubbers that can be improved by the process of this invention include cis-4-polybutadiene, butyl rubber, ethylene-propylene terpolymers, polymers of 1,3-butadiene, for example, 1,3-butadiene itself and of isoprene, copolymers of 1,3-butadiene with other monomers, for example, styrene, acrylonitrile, isobutylene, and methyl methacrylate. The invention relates to diene rubbers and the terms rubber and diene rubber are synonymous for the purpose of this invention.

The new compounds of this invention are prepared as follows:

To prepared N,N'-di(phenylthio)urea, a solution of 6.0 grams (0.1 mole) of urea and 25.0 grams (0.25 mole) of triethylamine in 200 ml. of DMF is cooled to −10°C. in a three-necked 500 ml. flask equipped with a mechanical stirrer and thermometer. To this solution is added slowly 28.8 grams (0.2 mole) of benzene sulfenyl chloride dissolved in 77 ml. carbon tetrachloride. During the addition the temperature is allowed to increase to 5°C. and a slurry of the triethylamine salt forms. This slurry is transferred to a 4.0 liter beaker and the product is precipitated by the addition of 3.0 liters of ice water with vigorous stirring. The brown solid is collected by filtration and upon recrystallization from ethanol yields a tan powder which melts at 104°–105°C. Analysis of the product shows 9.58% nitrogen and 23.13% sulfur. Calculated percentages for $C_{13}H_{12}N_2OS_2$ are 9.60% nitrogen and 22.00% sulfur. The infrared spectrum is consistent with the proposed structure. The new ureas listed, supra, are prepared in a similar manner with comparable results.

N-(Phenylthio)-4-cyclohexene-1,2-dicarboximide is prepared in the following manner: 14.4 grams (0.1 mole) of benzene sulfenyl chloride dissolved in 30.0 grams of carbon tetrachloride is added slowly to a mixture of 14.9 grams (0.1 mole) of 4-cyclohexene-1,2-dicarboximide and 12.0 grams (0.12 mole) of triethylamine in 250 ml. of benzene at 15°C. in a 500 ml. three-necked flask equipped with a stirrer and thermometer. The temperature is controlled at 15°C with external cooling during the addition of the benzene sulfenyl chloride. The reaction is then allowed to warm to room temperature and the triethylamine salt is removed by filtration, washed with a small amount of benzene and 200 ml. of heptane is added to the filtrate to precipitate the product. The benzene and heptane are removed under reduced pressure. There is obtained 25.2 grams of a white solid which melts at 105°–108°C. The product is recrystallized from carbon tetrachloride and has a melting point of 121°–122.5°C. Analysis shows 5.29% nitrogen and 11.69% sulfur. Calculated percentages for $C_{14}H_{13}NO_2S$ are 5.42% nitrogen and 12.39% sulfur. The new 4-cyclohexene-1,2-dicarboximides listed, supra, are prepared in a similar manner with comparable results.

The new 5,5-dimethylhydantoins are prepared in a similar manner to N-(phenylthio)-4-cyclohexene-1,2-dicarboximide with comparable results.

N-(Cyclohexylthio)glutarimide is prepared in the following manner: 20 grams (0.177 mole) of glutarimide is added in one portion to a mixture of 24 grams (0.24 mole) of triethylaminde and 200 ml. of dimethylformamide. To the resulting solution, 26.5 grams (0.177 mole) of cyclohexylsulfenyl chloride dissolved in 150 ml. of n-pentane is added dropwise over a 30 minute period. The temperature of the reaction increases from about 23° to 40°C. during the addition. The resulting slurry is stirred for an additional 30 minutes and then transferred to a 3.0 liter beaker. Two liters of cold water is then added to the slurry with vigorous stirring, and a light tan precipitate is formed. The solid is collected by filtration and allowed to dry at room temperature. The tan solid is recrystallized twice from heptane to yield long white needles which melt at 83°–85°C. Analysis of the product shows 13.70% sulfur and 6.02% nitrogen. Calculated percentages for $C_{11}H_{17}NO_2S$ are 14.13% sulfur and 6.16% nitrogen.

Other glutarimides and 3,3-dimethylglutarimide compounds of this invention are prepared in a similar manner with comparable results. Analysis of N-(cyclohexylthio)-3,3-dimethylglutarimide shows 12.25% sulfur and 5.34% nitrogen. Calculated percentages for $C_{13}H_{21}NO_2S$ are 12.57% sulfur and 5.5% nitrogen.

The following tables illustrate the invention in greater detail and the best mode for carrying it out, but are not to be construed as to narrow the scope of our invention. For all the rubber stocks tested and described, infra, as illustrative of the invention, Mooney scorch times at 121° and 135°C. are determined by means of a Mooney plastometer. The time in minutes ($t_5$) required for the Mooney reading to rise five points above the minimum viscosity is recorded. Longer times are indicative of the activity of the inhibitor. Longer times on the Mooney Scorch Test are desirable because this indicates greater processing safety. Percentage increases in scorch delay are calculated by dividing the Mooney scorch time of the stock containing the premature vulcanization inhibitor by the Mooney scorch time of the control stock, multiplying by 100, and subtracting 100. These increases show the percentage improvement in scorch delay over the control stock which contains no inhibitor. Additionally, cure ratings are calculated from the time required to cure the stocks at 144°C., and in some cases 153°C. Curing characteristics are determined by means of the Monsanto Oscillating Disc Rheometer described by Decker, Wise, and Guerry in *Rubber World*, December, 1962, page 68. From the Rheometer data, R.M.T. is the maximum torque in Rheometer units, $t_3$ or $t_2$ is the time in minutes for a rise of three or two Rheometer units, respectively, above the minimum reading and $t_{90}$ is the time required to obtain a torque 90% of the maximum.

The trademarks of some compounds used in the practice of this invention are Santocure MOR, Santoflex 77, Santocure NS, DPG, Thiofide, and Vultrol. Santocure MOR is the accelerator 2-(morpholinothio)-benzothiazole. Santoflex 77 is the antidegradant N,N'-bis(1,4-dimethylpentyl)-p-phenylenediamine. Santocure NS is the accelerator N-tert-butyl-2-benzothiazolesulfenamide. DPG is an accelerator reported to be diphenylguanidine. Thiofide is an accelerator reported to be benzothiazyl disulfide. Vultrol is a vulcanization retarder reported to be N-nitrosodiphenylamine.

Table I shows the results of tests on N-(phenylthio)-succinimide, N-(t-butylthio)phthalimide, N,N'-di(phenylthio)urea, 1,3-bis(phenylthio)-2-imidazolinone and N-(phenylthio)maleimide as premature vulcanization inhibitors in rubber. N-(Phenylthio)-maleimide gives a 174% increase in scorch delay over the control. The rubber mixture of the test is an A–6 masterbatch. A–6 masterbatch is composed of the following.

|  | Parts |
|---|---|
| Smoked Sheets | 100 |
| High Abrasion Furnace Black | 50 |
| Zinc Oxide | 5 |
| Stearic Acid | 3 |
| Hydrocarbon Softener | 10 |
| Total parts | 168 |

All stocks contain three parts Santoflex 77, 0.5 part Santocure MOR and 2.5 parts sulfur.

Table I

|  | A | B | C | D | E | F |
|---|---|---|---|---|---|---|
| A-6 Masterbatch | 168 | 168 | 168 | 168 | 168 | 168 |
| N-(Phenylthio)succinimide | — | 1.0 | — | — | — | — |
| N-(t-Butylthio)phthalimide | — | — | 1.0 | — | — | — |
| N,N'-Di(phenylthio)urea | — | — | — | 1.0 | — | — |
| 1,3-Bis(phenylthio)-2-imidazolidinone | — | — | — | — | 1.0 | — |
| N-(Phenylthio)maleimide | — | — | — | — | — | 1.0 |
| Mooney Scorch at 121°C. |  |  |  |  |  |  |
| $t_s$ | 24.5 | 47.7 | 28.1 | 52.0 | 55.0 | 67.2 |
| %Increase in Scorch Delay | — | 98.0 | 17.0 | 112.0 | 124.0 | 174.0 |
| Rheometer at 144°C. |  |  |  |  |  |  |
| R.M.T. | 67.3 | 66.0 | 56.7 | 68.0 | 66.7 | 59.8 |
| $t_3$ | 9.0 | 14.5 | 10.8 | 16.5 | 16.5 | 19.0 |
| $t_{90}$ | 21.5 | 27.4 | 34.2 | 29.2 | 29.2 | 33.0 |

An A-1 masterbatch is composed of:

|  | Parts |
|---|---|
| Natural Rubber | 100 |
| High Abrasion Furnace Black | 50 |
| Stearic Acid | 3 |
| Zinc Oxide | 5 |
| Hydrocarbon Softener | 3 |
| Total parts | 161 |

N-Phenyl-N'-(phenylthio)urea was treated in an A–6 masterbatch as a premature vulcanization inhibitor and shows a 97% increase in Scorch delay over the control. The results are reported in Table II.

Table II

| A-6 Masterbatch | 168 | 168 |
|---|---|---|
| Sulfur | 2.5 | 2.5 |
| Santocure MOR | 0.5 | 0.5 |
| Santoflex 77 | 3.0 | 3.0 |
| N-Phenyl-N'-(phenylthio)urea | — | 1.0 |
| Mooney Scorch at 121°C. |  |  |
| $t_s$ min. | 23.5 | 46.3 |
| % Increase in Scorch Delay | — | 97 |

Comparable results are obtained when the other unsymmetrical ureas of the invention are tested as premature vulcanization inhibitors.

Table III shows that the compounds 1,3-bis(trichloromethylthio-2-benzimidazolinone, N-[(trichloromethyl)thio]-4-cyclohexene-1,2-dicarboximide, 5,5-dimethyl-3-[(trichloromethyl)thio]hydantoin, and N-[(trichloromethyl)thio]maleimide are premature vulcanization inhibitors. In addition to the activity these compounds exhibit as premature vulcanization inhibitors, the rheometer tracings show that the rate of reversion during overcure of natural rubber is reduced.

Table III

|  | 1 | 2 | 3 | 4 | 5 |
|---|---|---|---|---|---|
| A-1 Masterbatch | 161 | 161 | 161 | 161 | 161 |
| Santoflex 77 | 3 | 3 | 3 | 3 | 3 |
| Santocure MOR | 0.5 | 05 | 05 | 05 | 05 |
| Sulfur | 2.5 | 2.5 | 2.5 | 2.5 | 2.5 |
| N-[(Trichloromethyl)thio]-4-cyclohexane-1,2-dicarboximide | — | 1.0 | — | — | — |
| 5,5-Dimethyl-3-[(trichloromethyl)thio]hydantoin | — | — | 1.0 | — | — |
| N-[(Trichloromethyl)thio]maleimide | — | — | — | 1.0 | — |
| 1,3-Bis(trichloromethylthio)-2-benzimidazolinone | — | — | — | — | 1.0 |
| Mooney Scorch at 121°C. |  |  |  |  |  |
| $t_s$ | 18.3 | 30.8 | 34.3 | 30.0 | 39.4 |
| %Increase in Scorch Delay | — | 68.0 | 87.0 | 64.0 | 115.0 |
| Rheometer at 144°C. |  |  |  |  |  |
| R.M.T. | 74.9 | 76.5 | 79.3 | 75.5 | 82.5 |
| $t_3$ | 6.8 | 9.0 | 10.5 | 9.9 | 12.6 |
| $t_{90}$ | 17.5 | 18.7 | 20.6 | 23.0 | 23.0 |

Tables IV and V show that the compound N-(cyclohexylthio)glutarimide, N-(cyclohexylthio)-3,3-dimethylglutarimide, and N-(phenylthio)benzamide are premature vulcanization inhibitors. The compounds are tested in a masterbatch composed of:

|  | Parts |
|---|---|
| Smoked Sheets | 100 |
| Intermediate Super Abrasion Furnace Black | 45 |
| Zinc Oxide | 3 |
| Stearic Acid | 2 |
| Aromatic Oil Plasticizer | 5 |

Table IV

|  | Stock 1 | Stock 2 | Stock 3 |
|---|---|---|---|
| Masterbatch | 155 | 155 | 155 |
| Sulfur | 2.5 | 2.5 | 2.5 |
| Santocure MOR | 0.5 | 0.5 | 0.5 |
| N-1,3-Dimethylbutyl-N'-phenyl-p-phenylenediamine | 2.0 | 2.0 | 2.0 |
| N-(Phenylthio)benzamide | — | — | 1.0 |
| N-(Cyclohexylthio)glutarimide | — | 1.0 | — |
| Mooney Scorch at 121°C. |  |  |  |
| $t_s$ | 35.2 | 85.8 | 85.3 |
| % Increase in Scorch Delay | — | 144 | 144 |
| Rheometer at 144°C. |  |  |  |
| R.M.T. | 61.0 | 61.2 | 63.8 |
| $t_2$ | 8.7 | 21.3 | 20.0 |
| $t_{90}$ | 27.7 | 42.1 | 39.2 |

Table V

|  | Stock 1 | Stock 2 |
|---|---|---|
| Masterbatch | 155 | 155 |
| Santocure NS | 0.5 | 0.5 |
| Sulfur | 2.5 | 2.5 |
| N-1,3-Dimethylbutyl-N'phenyl-p-phenylenediamine | 2.0 | 2.0 |
| N-(Cyclohexylthio)-3,3-dimethylglutarimide | — | 0.5 |
| Mooney Scorch at 121°C. |  |  |
| $t_s$ | 27.6 | 60.5 |

Table V — Continued

|  | Stock 1 | Stock 2 |
|---|---|---|
| % Increase in Scorch Delay | — | 120.0 |
| Rheometer at 144°C. |  |  |
| R.M.T. | 69.3 | 67.2 |
| $t_2$ | 8.9 | 17.2 |
| $t_{90}$ | 25.4 | 36.5 |

Table VI illustrates the use of 1,3-bis(cyclohexylthio)-2-imidazolidinone, 1,3-bis(cyclohexylthio)hydantoin, and 1-cyclohexylthio-2-imidazolidinone in a natural rubber masterbatch composed of the following:

|  | Parts |
|---|---|
| Natural Rubber | 100 |
| Intermediate Super Abrasion Furnace Black | 45 |
| Stearic Acid | 2.0 |
| Hydrocarbon Softener | 5.0 |
| Sulfur | 2.5 |
| Santocure MOR | 0.5 |
| Antidegradant | 2.0 |
| Zinc Oxide | 3.0 |

Table VI

| | | | | |
|---|---|---|---|---|
| Control | — | | | |
| 1,3-Bis(cyclohexylthio)-2-imidazolidinone | — | 1.0 | — | — |
| 1-Cyclohexylthio-2-imidazolidinone | — | — | 1.0 | — |
| 1,3-Bis(cyclohexylthio)hydantoin | — | — | — | 1.0 |
| Mooney Scorch at 121°C. | | | | |
| $t_s$ | 23.5 | 66.3 | 58.5 | 94.9 |
| % Increase in Scorch Delay | — | 182.0 | 149.0 | 336.0 |
| Rheometer at 144°C. | | | | |
| R.M.T. | 56.5 | 58.8 | 61.5 | 57.0 |
| $t_2$ | 7.0 | 15.0 | 15.0 | 22.0 |
| $t_{90}$ | 18.7 | 35.2 | 31.8 | 38.0 |

Table VII shows that comparable results are obtained when the imide moiety is benzimidazolinon-1-yl, benzothiazolinon-1-yl, or benzoxazolinon-1-yl, and that good results are obtained when the imide moiety is 5,5-diphenyl-3-hydantoin-yl.

The control stock (1) is stock A of Table I, supra, to which is added 1 part of prevulcanization inhibitor as follows:

| Stock No. | |
|---|---|
| 1 | None |
| 2 | 3-(Trichloromethylthio)-5,5-diphenyl hydantoin |
| 3 | 3-Trichloromethyl-2-benzothiazolinone |
| 4 | 1-Trichloromethylthio-2-benzimidazolinone |
| 5 | 3-Trichloromethylthio-2-benzoxazolinone |

The results for Stock No. 1 are the average values obtained from three separately prepared samples.

Table VII

|  | Stock 1 | Stock 2 | Stock 3 | Stock 4 | Stock 5 |
|---|---|---|---|---|---|
| Mooney Scorch at 121°C. | | | | | |
| $t_s$ | 22.1 | 37.5 | 30.8 | 31.1 | 32.1 |
| $t_{35-5}$ | 3.4 | 3.8 | 2.3 | 3.7 | 2.6 |

Comparable results to those in the tables, supra, illustrating utility are obtained with the inhibitors of this invention which are not illustrated.

Concentration studies show the inhibitors of this invention are effective in rubber at concentrations of 0.05 to 5.0 parts per hundred. Concentrations from 0.10 to 3.0 parts per hundred are preferred.

From the foregoing description, it will be appreciated that in the formula

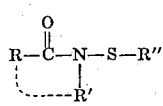

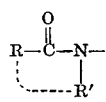

can be a radical derived by removal of hydrogen from an imide of a dicarboxylic acid. The term "imide of a dicarboxylic acid" is used in a configurational sense to indicate two carbonyls joined to a single nitrogen, although more than one such configuration may be present in the same molecule. For example, the mono and diimides of benzene tetracarboxylic acid are regarded in the present specification and claims as imides of dicarboxylic acids. The hydantoins, uracil, and parabanic acid also fall into the category of imides of dicarboxylic acid. The cyclic ureas, by which are meant monocarbonyl cyclic ureas as distinguished from cyclic ureas containing two carbonyls joined to a single nitrogen, present a configuration the reverse of imides of dicarboxylic acids in that only a single carbonyl is present and is joined to two nitrogen atoms. The preferred radicals conforming to

are derived from azoles. By azoles are meant the general class of pentatomic heterocyclic ring compounds whether or not unsaturation is present in the ring. Both the imides of dicarboxylic acids and cyclic ureas include pentatomic heterocyclic ring compounds. Other suitable radicals are derived from monocarbonyl azoles containing one nitrogen atom and one other different hetero atom, for example, sulfur or oxygen, in the ring.

The radicals derived by removal of hydrogen from an imide of a dicarboxylic acid include, for example,

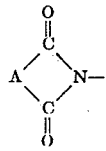

where A is divalent aliphatic, cycloaliphatic, or aromatic radical. Thus A is alkylene, cycloalkylene, alkenylene, cycloalkenylene, or arylene. Alkylene radicals belong to the series $-C_nH_{2n}-$. Alkenylene radicals are olefinically unsaturated aliphatic divalent radicals having the valence on separate carbon atoms, for example, propenylene $-CH_2CH=CH-$. The corresponding cyclic forms are cycloalkylene, for example, cyclohexylene $-C_6H_{10}-$ and cycloalkenylene, for example, cyclohexenylene $-C_6H_8-$. The divalent aromatic radicals are arylene radicals, for example, phenylene. The radicals derived by removal of hydrogen from a monocarbonyl cyclic urea include, for example,

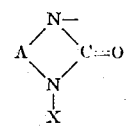

where A has the same meaning as before and X is hydrogen, alkyl, aryl, cycloalkyl, or SR", R" being alkyl, aryl, or cycloalkyl.

Suitable acyclic ureas may be represented by the formula

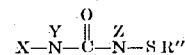

where X, Y, and Z individually are hydrogen, R", or SR", R" being alkyl, aryl, or cycloalkyl as before.

The special case wherein an imido radical is formed from two independent acyl radicals and amide derivatives comprise other valuable classes which may both be represented by the formula.

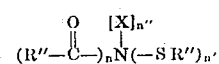

where $n$, $n'$, and $n''$ are integers, the sum of which is three, n and n' being one or two, and $n''$ being zero or one, and R" and X having the same meaning as before.

It is intended to cover all changes and modifications of the examples of the invention herein chosen for purposes of disclosure which do not constitute departures from the spirit and scope of the invention. The matter contained in each of the following claims is to be read as part of the general description of the present invention.

We claim:

1. A compound of the formula

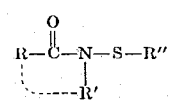

in which

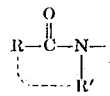

is 3-hydantoinyl, 5,5-dimethyl-3-hydantoinyl, 5,5-diphenyl-3-hydantoinyl, 1-(R''-S-)-3-hydantoinyl or 1-(R''-S-)-5,5-dimethyl-3-hydantoinyl and R'' is alkyl of 1–20 carbon atoms, phenyl, tolyl, naphthyl, benzyl or cycloalkyl of 5–12 carbon atoms.

2. A compound according to claim 1 in which

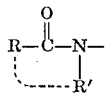

is 5,5-dimethyl-3-hydantoinyl.

3. A compound according to claim 2 in which R'' is cyclohexyl.

4. A compound according to claim 1 in which

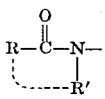

is 3-hydantoinyl.

5. A compound according to claim 4 in which R'' is cyclohexyl.

6. A compound according to claim 1 in which

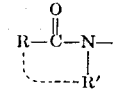

is 1-(R''-S-)3-hydantoinyl.

7. A compound according to claim 6 in which R'' is cyclohexyl.

8. A compound according to claim 2 in which R'' is phenyl.

9. A compound according to claim 1 in which

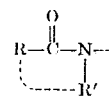

is 1-(R''-S-)5,5-dimethyl-3-hydantoinyl.

10. A compound according to claim 6 in which R'' is phenyl.

* * * * *